United States Patent [19]

Ackermann et al.

[11] 4,051,118
[45] Sept. 27, 1977

[54] WATER-SOLUBLE DISAZO DYESTUFFS CONTAINING A 3- OR 4-[PYRAZOLYLENE-(1)-BENZOYLAMINO]-6-SULPHOPHENYL MOIETY

[75] Inventors: Hans Ackermann, Riehen; Fabio Beffa, Basel, both of Switzerland

[73] Assignee: Ciba-Geigy AG, Basel, Switzerland

[21] Appl. No.: 566,520

[22] Filed: Apr. 8, 1975

Related U.S. Application Data

[60] Continuation of Ser. No. 429,773, Jan. 2, 1974, abandoned, which is a continuation of Ser. No. 186,761, Oct. 5, 1971, abandoned, which is a division of Ser. No. 753,876, Aug. 20, 1968, Pat. No. 3,697,500.

[30] Foreign Application Priority Data

Aug. 21, 1967 Switzerland ............... 11738/67

[51] Int. Cl.$^2$ ............... C09B 62/08; C09B 62/24; C09B 62/74; C09B 62/82
[52] U.S. Cl. ............... 260/153; 260/154; 260/158; 260/160; 260/162; 260/163
[58] Field of Search ............... 260/146 D, 146 T, 147, 260/153, 154, 157, 158, 160, 161

[56] References Cited

U.S. PATENT DOCUMENTS

| | | |
|---|---|---|
| 2,993,038 | 7/1961 | Fasciati et al. ............ 260/153 |
| 3,196,145 | 7/1965 | Reding et al. ............ 260/153 |
| 3,288,777 | 11/1966 | Benz et al. ............ 260/146 D |
| 3,304,297 | 2/1967 | Wegmann et al. ............ 260/153 |
| 3,449,317 | 6/1969 | De Montmollin ............ 260/161 |
| 3,450,689 | 6/1969 | Langbein et al. ............ 260/147 |

Primary Examiner—Floyd D. Higel
Attorney, Agent, or Firm—Wenderoth, Lind, & Ponack

[57] ABSTRACT

Water-soluble disazo dyestuffs of the formula

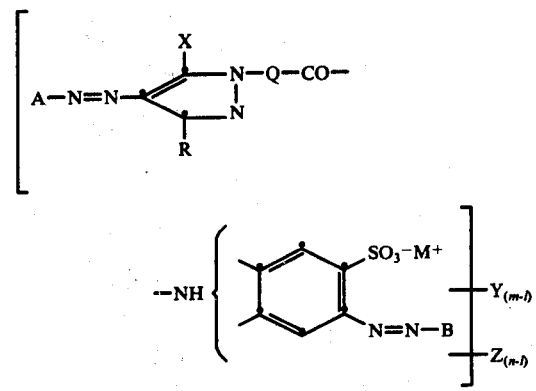

wherein
 A represents phenyl, naphthyl or phenyl or naphthyl substituted by lower alkyl or sulphamoyl,
 B represents phenyl, lower alkyl-phenyl, naphthyl, phenol, lower alkylphenol, naphthol, benzoylaminonaphthol, N-methyl-N'-m-chloro-phenyl barbituric acid, or di-(phenylamino) malonic acid,
 Q represents 1,3- or 1,4-phenylene or 1,3- or 1,4-phenylene substituted by lower alkyl, chloro or bromo,
 R represents lower alkyl or $COO^-M^+$,
 X represents hydroxy or amino,
 Y represents a fiber reactive grouping capable of covalent bonding with cellulose and polyamide fibers group directly linked to a ring carbon atom of A or B,
 m represents a positive integer of at most 3, and
 n represents a positive integer of at most 5,
and wherein which when m is 3, one Y is linked to A and the other to B are described. These dyestuffs are useful as dyes for cellulose and polyamide fibers.

8 Claims, No Drawings

WATER-SOLUBLE DISAZO DYESTUFFS CONTAINING A 3- OR 4-[PYRAZOLYLENE-(1)-BENZOYLAMINO]-6-SULPHOPHENYL MOIETY

This application is a continuation of application Ser. No. 429,773, filed Jan. 2, 1974 (now abandoned), which in turn is a continuation of application Ser. No. 186,761, filed Oct. 5, 1971 (now abandoned), which is in turn a divisional application of our application Ser. No. 753,876, filed on Aug. 20, 1968, now U.S. Pat. No. 3,697,500.

The present invention concerns new, water soluble disazo dyestuffs, processes for the production thereof, processes for the dyeing and printing of organic material, particularly natural and synthetic polyamide, and natural and regenerated cellulose textile material using the new dyestuffs, as well as, as industrial product, the organic material dyed or printed with the aid of these dyestuffs.

The new, valuable, water-soluble disazo dyestuffs are of general formula I

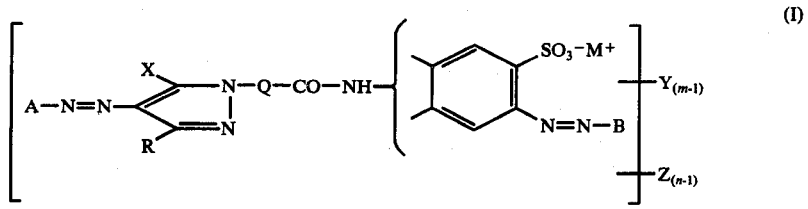

wherein
- A represents an unsubstituted or non-chromogenically substituted phenyl or unsubstituted or non-chromogenically substituted naphthyl radical,
- B represents the radial of an azo dyestuff coupling component,
- Q represents a divalent unsubstituted or non-chromogenically substituted 1,3- or 1,4-phenylene radical,
- R represents lower alkyl or $COO^-M^+$,
- X represents hydroxy or amino,
- Y represents a reactive grouping capable of covalent bonding with cellulose and polyamide fiber molecules, which grouping is linked to a carbon atom of A or B,
- Z represents a water-solubilising group which dissociates acid in water, and which is linked to a ring carbon atom of A, Q or B,
- $M^+$ represents the equivalent of a colorless cation,
- $m$ represents a positive integer of at most 3, and
- $n$ represents a positive integer of at most 5, and in such dyestuffs in which $m$ is 3, one Y is linked to A and the other to B.

These dyestuffs are obtained when the diazonium compound of an amino azo dyestuff of the general formula II

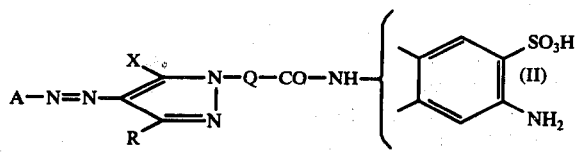

is coupled with a coupling component of the general formula III $$B - H \quad (III)$$

the components II and III being so chosen that they each contain at most one reactive substituent Y and together contain at most 4 groups Z. The symbols in formulae II and III have the meanings given in formula I.

Non-chromogenic substituents are substituents which do not fundamentally alter the chromogenic system of the dyestuff as shown in Formula I, (contrary to such substituents as anthraquinonyl or phthalocyanine radicals which would alter such system).

Primarily, A represents a phenyl radical, optionally also, a naphthyl radical, which can contain the ring substituents usual in azo dyestuffs. Examples of such are: lower alkyl groups such as the methyl, ethyl, propyl, isopropyl or tert. butyl group, halogen atoms such as fluorine, chlorine and bromine, the nitro group, aliphatic or aromatic acylaminogroups such as the acetylamino or benzoylamino group, the ethoxycarbonylamino group, lower alkoxy groups such as the methoxy or ethoxy group, lower alkylsulphonyl and sulphamoyl groups or sulphamoyl groups substituted by lower alkyl groups. Preferably, the radical A is a phenyl radical which contains a sulphonic acid group in o-position to the azo bond and which can contain the reactive substituent Y.

Examples of coupling components of the general formula III which introduce the radical B into the disazo dyestuffs according to the invention are: phenols such as 4-methylphenol, 4-acetylaminophenol or 3,4-dimethylphenol; anilines such as m-methyl aniline or m-methoxy aniline; naphthols such as β-naphthol, 2-hydroxynaphthalene-3-, -4-, -6-, -7-sulphonic acid, 2-hydroxynaphthalene-6,8-disulphonic acid, 1-hydroxynaphthalene-4-sulphonic acid, 1-hydroxynaphthalene-3,6-, -3,8- or -4,6-disulphonic acid; naphthylamines such as 1-aminonaphthalene-4-sulphonic acid; 2-aminonaphthalene-5- or -6- sulphonic acid, 2-aminonaphthalene-5,7-disulphonic acid; aminonaphthols such as 1-hydroxy-6-aminonaphthalene-3-sulphonic acid, 1-hydroxy-7-amino-naphthalene-3-sulphonic acid, 1-hydroxy-8-aminonaphthalene-3,6-or 4,6-disulphonic acid, 1-hydroxy-8-benzoylaminonaphthalene-3,6-disulphonic acid. Preferably, heterocyclic coupling components are used, in particular pyrazol-5-ones such as 3-methyl-pyrazol-5-one, chiefly however, 1-phenyl-3-methyl-, 1-phenyl-3-carboxy-, 1-phenyl-3-carbalkoxy-, or 1-phenyl-3-carbamidopyrazol-5-ones such as 1-phenyl-3-methyl-pyrazol-5-one, 1-(2′,5′-disulphophenyl)-3-methyl-pyrazol-5-one, 1-(4′-sulphophenyl)-3-carboxy-pyrazol-5-one, 1-(2′-chloro-5′-sulphophenyl)-3-methyl-pyrazol-5-one, 1-(2′,5′-dichloro-4′-sulphophenyl)-3-methyl-pyrazol-5-one, 1-(4′-methyl-2′-sulphophenyl)-3-methyl-pyrazol-5-one, 1-(4′-sulphophenyl)-3-methylpyrazol-5-one, 1-(4'-carboxy-2'-sulphophenyl)-3-methyl-pyrazol-5-one, also 1-naphthyl-3-methyl-pyrazol-5-ones such as 1-(4',8'-disulphonaphthyl-2')-3-methyl-pyrazol-5-one, or 5-amino- or -5-imino-pyrazoles such as 1-phenyl-3-methyl-5-aminopyrazole, 1-(3'-sulphophenyl)-3-methyl-5-aminopyrazole, or pyrimidines, particularly 2,4,6-triaminopyrimidines such as 2-amino-4,6-di-m-sulphophenylamino-pyrimidine, or 2,4,6-trihydroxy-pyrimidine derivatives such as N-methyl-N'-m-chlorophenyl barbituric acid.

Sulphonic acid or carboxyl groups, lower alkyl groups such as the methyl, ethyl, propyl, isopropyl or n-butyl group, or halogen atoms such as fluorine, chlorine or bromine are used as substituents in the m- or p-phenylene radical Q. Preferably however, Q is not further substituted.

R in the meaning of a lower alkyl group can be, e.g. a methyl, ethyl, propyl, isopropyl or n-butyl group. Preferably R is the methyl group.

Preferred water-soluble disazo dyestuffs of formula I contain one or two fibre-reactive substituents Y, capable of chemical bonding especially to cellulose fibres. In these dyestuffs $n$ ranges preferably from 2 to 5. The fibre-reactive component of these substituents can be bound directly or by way of bridging members such as oxygen, sulphur or methyleneimino, preferably however, by way of an imino, carbonylimino, sulphonylimino or ureylene group, to an aromatic ring.

A and/or B of the dyestuff molecule. Substituents can be introduced into the disazo molecule by the usual conversion reactions in any step of the dyestuff production desired.

Examples of such substituents Y are: the radical of an acid contaning at least one mobile halogen atom and/or a C—C— polylinkage to which addition can be made, e.g. chloro- or bromo- acetic acid, $\beta$-chloro, and $\beta$-bromo- propionic acid, tetrahalogen cyclobutane carboxylic acid such as 2-chloro-2-fluoro-3,3-difluoro-cyclobutane-1-carboxylic acid, propiolic acid, acrylic acid, methacrylic acid, $\alpha$-chloro-, $\beta$-chloro, $\alpha$-bromo- and $\beta$-bromo- acrylic acid, $\alpha,\beta$- and $\beta,\beta$-dichloroacrylic acid, $\alpha,\beta$- and $\beta,\beta$-dibromoacrylic acid, trichloro- or tribromoacrylic acid, crotonic acid, $\alpha$- or $\beta$-chlorocrotonic acid, $\alpha$-or $\beta$-bromocrotonic acid, $\alpha,\beta$-dichlorocrotonic acid, maleic acid, monochloro- and monobromo- maleic acid, dichloro- and dibromo- maleic acid, fumaric acid, monochloro- and monobromo fumaric acid, dichloro- and dibromo- fumaric acid, fumaric acid monoester, dichloro- and dibromo- succinic acid, or the radical of a nitrohalogen benzoic acid or nitrohalogen benzene sulphonic acid having a mobile halogen atom, particularly fluorine or chlorine in o- or p-position to the nitro group, such as the radical of 3-nitro-4-fluoro-benzoic acid or 3-nitro-4-fluorobenzene sulphonic acid.

$\beta$-Hydroxy-alkylsulphonyl or $\beta$-hydroxy-sulphamoyl groups esterified with strong acids such as the $\beta$-halogenoethylsulphonyl and, preferably, $\beta$-sulphatoethyl-sulphonyl group, for example, are used as fibre-reactive radical Y bound direct to an aromatic ring, preferably to one of the radicals A and B of the dyestuff molecule.

However, fibre-reactive dyestuffs obtainable according to the invention preferably contain, as reactive substituents Y, the radical of an aromatic nitrogen heterocycle having, advantageously more than one ring hetero atom, which heterocyclic ring contains at least one mobile halogen atom or several mobile halogen atoms, preferably chlorine, but also fluorine or bromine, or an ammonium, sulphonic acid or alkylsulphonyl group, at a ring carbon atom. Such a heterocyclic ring can be bound to the molecule of disazo dyestuffs according to the invention by way of an amino group or, optionally, by way of a carbonyl or sulphonyl amide group.

Examples of such preferred substituents Y are: a triazinyl or diazinyl radical bound by way of an imino, carbonylimino or ureylene group, which radical contains at least one mobile halogen atom, e.g. the radical of cyanuric chloride, cyanuric bromide or primary condensation products thereof in which a halogen atoms is replaced by the optionally further substituted radical of a primary or secondary aliphatic, alicyclic, aromatic or heterocyclic amine, in particular by aniline or its alkyl, sulphonic acid or carboxylic acid derivatives, by lower mono- and di- alkylamines, as well as by ammonia, or by the radical of an aliphatic, alicyclic, aromatic or heterocyclic hydroxy or thiol compound. Primarily, however, the fibre-reactive substituent Y represents a polyhalogen pyrimidyl radical such as the dichloro-dibromo-, difluoro-, dichlorobromo- or dichlorofluoro-pyrimidyl radical or, particularly the tri-chloro-, tri-bromo-, trifluoro- and difluorochloro-pyrimidyl radical. The dihalogen pyrimidyl radical can contain for example, the following substituents in the 5-position: methyl, ethyl, carboxylic or sulphonic acid amide optionally substituted at the nitrogen atom, carboxylic acid methyl or ethyl ester, acyl, e.g. benzoyl, alkylene, e.g. allyl, chlorovinyl, substituted alkyl e.g. carboxymethyl, chloro-or bromo- methyl, particularly however, halogen. Advantageously, the substituent Y also represents the radical of a reactive heterocyclic carboxylic or sulphonic acid such as the radical of halogen pyrimidine carboxylic acid, or 2,3-dihalogen quinoxaline carboxylic or sulphonic acid, of 2 benzothiazole or 2-halogen benzoxazole carboxylic or sulphonic acid, of halogen phthalazine carboxylic acid, halogen quinazoline carboxylic acid, of halogen quinoxaline carboxylic or sulphonic acid, or of halogen-6-pyridazon-1-yl-alkylene carboxylic acid or of halogen-6-pyridazon-1-yl-phenylene carboxylic acid. The following compounds which introduce the radical Y are particularly suitable: 2,4,6-trichlorotriazine, 2,4,6-tribromotriazine, 2,4,6-trichloro-, 2,4,6-trifluoro- or 2,4,6-tribromo- pyrimidine, 2,4,6-trifluoro-5-chloro- or 2,4,6-trichloro-5-bromo-pyrimidine, 2,4,5,6-tetrachloro- or 2,4,5,6-tetrabromo-pyrimidine, 2,4-dichloropyrimidine-5- or -6- carboxylic acid, 2,3-dichloroquinoxaline-6-carboxylic acid or 2,3-dichloroquinoxaline-6-sulphonic acid, 2-chlorobenzothiazole-5- or -6-carboxylic or-sulphonic acid, 2-chlorobenzoxazole-5- or -6- carboxylic or sulphonic acid, 1-4-dichloro- or 1,4-dibromo- phthalazine-6-carboxylic or -6-sulphonic acid, 2,4-dichloroquinazoline-6- or -7-carboxylic acid, 2,3-dichloroquinoxazoline-7-carboxylic or -7-sulphonic acid, 4,5-dichloro-6-pyridazon-1-yl-trimethylene or 1',4'-phenylene carboxylic acid.

Advantageously each of the radicals A or B contain at most one such reactive substituent Y, preferably a triazinyl or diazinyl radical having at least one mobile halogen atom, which radical is bound by way of an imino, carbonylimino or ureylene group.

Particularly valuable are those dyestuffs of formula I in which Y represents a fiber-reactive grouping selected from

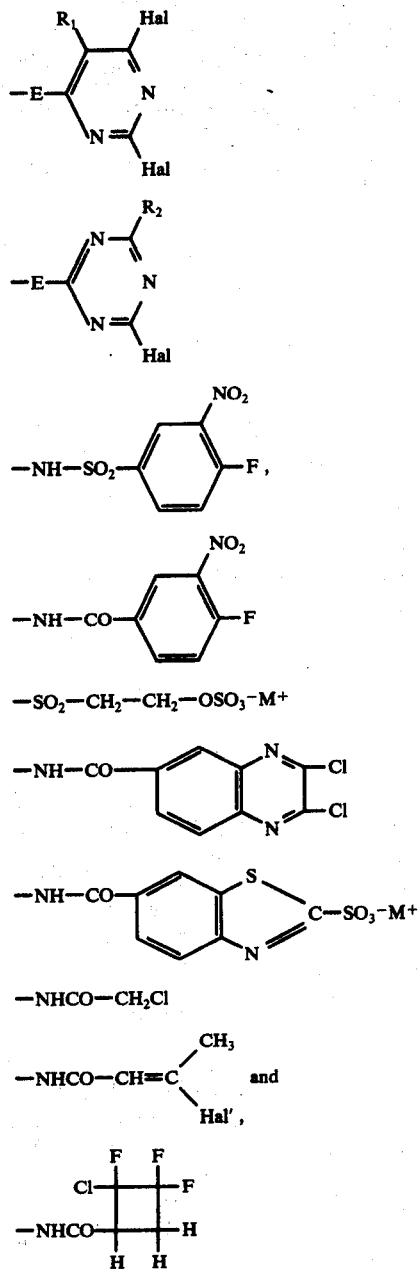

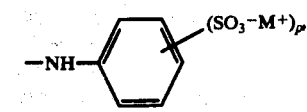

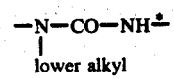

Hal representing fluorine, chlorine or bromine,
Hal' representing chlorine or bromine,
$R_1$ representing hydrogen, chlorine, bromine or cyano,
$R_2$ representing fluorine, chlorine, bromine, lower alkylamino, or p representing 1 or 2, and
E representing —NH—, or —NH—CO—, the bond — being linked to the remainder of Y.

As salt-forming, water-solubilising groups which dissociate acid in water, corresponding to Z, dyestuffs according to the invention preferably contain sulphonic acid groups, also phosphonic acid groups or carboxyl, or disulphimide or monoester groups of polybasic acids, e.g. sulphate groups. Z in the dyestuff molecule can also have several of these meanings.

The water-soluble disazo dyestuffs of formula I according to the invention can be produced by the usual methods. They are obtained as mentioned hereinbefore, e.g. by coupling a diazotised aminoazo dyestuff of general formula II with a coupling component of general formula III, advantageously in weakly acid to neutral medium and at a temperature of 0°–40° C, precipitating the dyestuff formed by the addition of a neutral salt such as sodium or potassium chloride, isolating by filtration and then drying the filter residue, optionally at a raised temperature and in vacuo. If desired, a subsequent purification to remove undesirable side products is indicated which can be done e.g. by dissolving the disazo dyestuffs in water and recrystallising.

Aminoazo dyestuffs of general formula II are produced in the known way, e.g. by coupling a diazotised aromatic amine the aryl part of which corresponds to the definition of A, with a compound of general formula IV

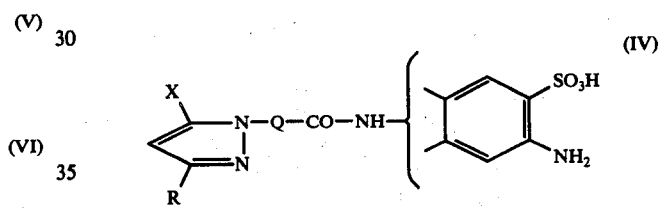

(IV)

wherein Q, R and X have the meanings given in formula I. Particularly suitable diazo components are derived e.g. from the following aromatic amines: 1-aminobenzene-2-, -3- or -4- sulphonic acid, 1-amino-4-methylsulphonylbenzene, 1-amino-3- or -4-sulphamoylbenzene, 1-amino-2-, -3- or -4-chlorobenzene, 1-amino-2-, -3- or -4- methoxybenzene, 1-amino-2-, -3- or -4-ethoxybenzene, 1-amino-2-, -3- or -4-methylbenzene, 1-amino-2-, -3- or -4- carboxybenzene, 1-amino-3- or -4- acylaminobenzene e.g. 1-amino-3-acetylaminobenzene or 1-amino-4-benzoylaminobenzene, 1-aminobenzene-2,4- or 2,5-disulphonic acid, 1-amino-4-methylbenzene-2-sulphonic acid, 1-amino-2-chlorobenzene-4-sulphonic acid, 1-amino-4-methoxybenzene-2-sulphonic acid, 1-amino-4-acetylaminobenzene-2-sulphonic acid, 1-amino-4-methyl-5-ethoxycarbonylaminobenzene-2-sulphonic acid as well as 1-amino-benzene-2-sulphonic acid, which have a reactive substituent Y in 4- or 5-position such as the 1-amino-4- or -5- (4',6'-dichloro-triazinyl-2'-amino)-benzene-2-sulphonic acid, 1-amino-4- or -5-(2',4',5'-trichloropyrimidyl-6'-amino)-benzene-2- sulphonic acid; also α-naphthylamines such as 1-aminonaphthalene-3-, -4-, -6-or -7-sulphonic acid or 1-amino-2-methoxy-naphthalene-6-sulphonic acid, β-naphthylamines such as 2-amino-naphthalene-1-, -5-, -6- or -7-sulphonic acid, 2-amino-naphthalene-1,5-4,8- or -5,7-disulphonic acid or 2-amino-naphthalene-1,5,7-trisulphonic acid.

The compounds of general formula IV are obtained by known methods, e.g. by conversion of 1-aminophenyl-4-(N-3'[or -4']-acetylamino-4'[or -3'] -sulphophenyl)-carboxylic acid amide into pyrazol-5-one or 5-imino-pyrazole by way of the corresponding 1-hydrazino derivative and subsequent saponification of the acetyl group in hydrochloric acid solution.

A modification of the process according to the invention for the production of new, water-soluble disazo dyestuffs of formula I consists in reacting a disazo dyestuff of the general formula V

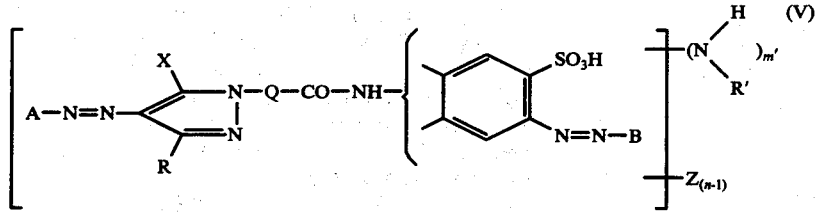

wherein R' preferably represents hydrogen or lower alkyl and m' represents the integers 1 or 2, and A,B,Q,R,X,Z and n have the meanings given in formulae I, II and III, with a compound introducing the fibre-reactive group Y, the components of formula V and of the fibre-reactive compound being so chosen that the disazo dyestuff of formula I contains at most 4 groups Z.

Starting materials of formula V wherein

represents a reactive amino group, can be obtained e.g. by saponification of disazo dyestuffs of formula I containing instead of the group Y an acylamino group, which can be obtained according to the invention. They can also be produced by reduction of corresponding disazo dyestuffs of formula I containing a nitro group instead of an acylamino group. These acylamino or nitro disazo dyestuffs can be produced by the usual diazotisation and coupling methods.

As suitable compounds introducing the fibre-reactive substituent Y for this embodiment of the invention, of course the halides, particularly the chlorides or anhydrides of the carboxylic and sulphonic acids mentioned in the discussion of Y as well as isocyanates or isothiocyanates or halogen triazines and diazines having more than one mobile halogen atom are used.

The reaction of the amino disazo dyestuffs of general formula V with the agents mentioned to introduce the reactive substituent Y is performed in the usual way, advantageously in aqueous medium, optionally in the presence of inert organic solvents which can easily be removed, such as lower aliphatic ketones, e.g. acetones, and preferably in the presence of agents which buffer mineral acid such as sodium or potassium carbonate, sodium or potassium hydroxide, di- or tri-sodium phosphate, di- or tri- potassium phosphate, sodium or potassium acetate, or tertiary nitrogen bases such as pyridine.

On completion of the reaction, the completely formed reactive dyestuff is salted out of its optionally previously neutralised solution or suspension with sodium chloride, or potassium chloride, or it is precipitated with acid, then filtered off under suction, washed and dried, optionally at a raised temperature and under reduced pressure.

Finally, another modification of the process for the production of the new disazo dyestuffs consists, in treating a disazo dyestuff of general formula VI

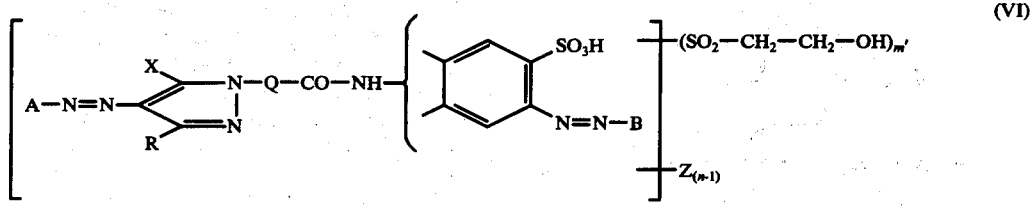

wherein A,B,Q,R,X,Z, m' and n have the meanings given in formulae I, II, III and V, with compounds which introduce ester groupings.

The esterification of the aliphatic hydroxyl group is performed in the usual way, using e.g. phosphoric acid, chlorosulphonic acid, sulphur trioxide, addition products of sulphur trioxide to nitrogen bases such as pyridine, chiefly however, using sulphuric acid or mixtures of sulphuric acid and sulphur trioxide as compounds introducing ester groups.

Disazo dyestuffs of general formula VI can also be produced by known processes, e.g. by coupling a diazotised amino azo dyestuff of general formula II with a coupling component of general formula III, whereby at least one of the two components entering into the coupling reaction has a β-hydroxyethylsulphonyl radical.

The new dyestuffs obtainable according to the invention are yellow, orange or red powders which, in the form of their alkali metal salts, dissolve well in water. They are suitable for the dyeing and printing of organic material, particularly natural and synthetic polyamide, or natural or regenerated cellulose textile material in yellow, orange to red shades by the processes usual for these substrates.

Dyestuffs of formula I in which m is preferably 1 and n is 1 or 2 have very good affinity to natural polypeptides such as wool or silk, chiefly however, to synthetic polyamide fibres such as Nylon, Perlon and Banlon, and they draw completely onto this material, in many cases even from a neutral to weakly acid, e.g. weakly acetic acid, bath and produce level, non-streaky dyeings, some of which are brilliant. If desired, the water-solubility of such dyestuffs is increased by the admixture of anion active or non-ionic wetting or dispersing agents or of diluting agents. They are distinguished by good migratory powers on the fibres mentioned. Often, the addition of compounds containing basic nitrogen is indicated on dyeing, e.g. the addition of polyquaternary ammonium compounds. The dyeings with the water-soluble disazo dyestuffs according to the invention on synthetic polyamide such as Nylon 6 or Nylon 66 have excellent wet and light fastness. Surprisingly, mixed fabric made of nylon and wool is dyed in the same shade. On using reactive dyestuffs, the dyeing can be advantageously given a subsequent treatment with mineral acid binding agents such as ammonia or hexamethylenetetramine.

The new reactive disazo dyestuffs of formula I, obtainable according to the invention are, however, particularly suitable for the dyeing and printing of natural and regenerated cellulose material such as viscose staple fibre, jute, ramie, hemp and, primarily, cotton. In this case, to attain sufficient solubility, the dyestuffs should generally contain at least 2, preferably 3 to 4, water-solubilising groups which dissociate acid in water, particularly sulphonic acid and also carboxyl groups.

These materials are dyed with the reactive dyestuffs obtainable according to the invention by known methods. For example, the cellulose material is impregnated or printed at a low temperature, e.g. at 20°-50° C, with the optionally thickened dyestuff solution and then the dyestuff is fixed by treatment with acid binding agents. As such, sodium carbonate, potassium carbonate, di- and tri-sodium phosphate, sodium hydroxide solution, also at temperatures higher than 50° C, potassium or sodium bicarbonate, among others are used. Instead of giving the impregnated materials a subsequent alkaline treatment, in many cases the acid binding agent, preferably in the form of alkaline carbonates, can also be added to the impregnation liquors or printing pastes, after which the dyeing is developed by heating or steaming for a short time at temperature of over 100° to 160° C or by storing for a longer time at room temperature. The addition of hydrotropic agents to the printing pastes and impregnation liquors is advantageous in this process, e.g. the addition of urea in amounts of 10 to 200 g per liter of dyeing agent. Cellulose material is advantageously dyed by the exhaustion process by introducing the cellulose to be dyed into the dyebath (long liquor ratio) which contains an acid binding agent and, optionally also neutral salts such as sodium chloride or sodium sulphate, at a slightly raised temperature, gradually raising the temperature of the dyebath to 40°-100° C and completing the dyeing process at this temperature. If desired, the addition of the neutral salts to the dyebath to accelerate the drawing of the dyestuff can be made after the actual dyeing temperature has been attained. Furthermore, in spite of great affinity to cellulose, the dyestuffs according to the invention have good solubility and little sensitivity to electrolytes, and the unfixed dyestuff can be easily washed out, this being one of the essential prerequisites for good wet fastness properties such as good fastness to washing, alkali, milling and perspiration. The dyeings not only have the usual good wet fastness properties but, in particular, they also have very good fastness to light; they are fast to boiling and, when combined with synthetic resin finishes, there is no change of shade. Thus, because of the simultaneous combination of all of these valuable properties, the dyestuffs according to the invention are superior to the nearest comparable known reactive dyestuffs.

Particularly valuable, easily accessible, fibre-reactive disazo dyestuffs according to the invention which are distinguished by their greenish yellow shades and good dyeing properties are derived from disazo dyestuffs of general formula I wherein A is a phenyl radical which has a sulphonic acid group in o-position to the azo bond and which contains, as further substituent, a triazinyl or diazinyl radical Y having at least one mobile halogen atom, which radical is bound by way of an imino, carbonylimino or ureylene group, B is a pyrzolonyl radical and the —N=N—B grouping is bound to the benzene nucleus in m-position to the —Q—CO—NH group.

The greenish tinge of these dyestuffs is very desirable and important because the dyestuffs according to the invention then become especially suitable for combinations with reactive dyestuffs based on copper phthalocyanine which dye in turquoise shades.

The expressions "low" and "lower" in connection with alkyl, alkoxy or alkylsulphonyl means, that these groups have at most 5 carbon atoms.

The following non-limitative examples illustrate the invention. The temperatures are given therein in degrees Centigrade.

While, in the formulae given in these examples, —SO₃H and —COOH are used to represent the respective water-solubilising acid groups, the dyestuffs are usually obtained as the neutral sodium salts. The potassium salts and ammonium salts are obtained by precipitating the dyestuffs with potassium chloride or ammonium chloride in lieu of sodium chloride.

EXAMPLE 1

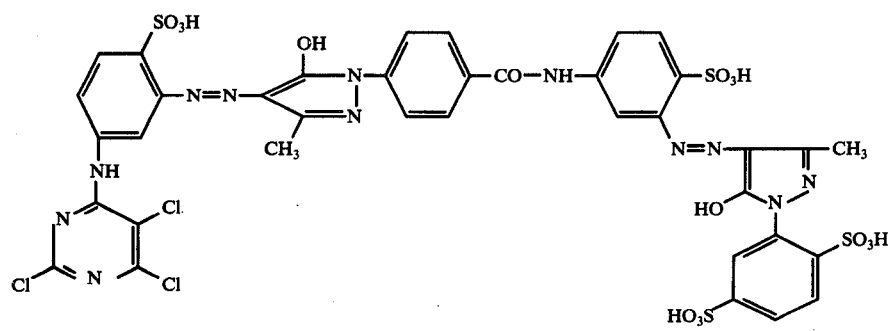

75.8 g of the monoazo dyestuff obtained by coupling diazotised 2-amino-4-(2',5'-6'-trichloropyrimidyl-4'-amino)benzene sulphonic acid with 1-phenyl[4'-N-(3"-amino-4"-sulphophenyl)-carbonamide]-3-methyl-pyrazol-5-one, in the form of the sodium salt, are slurried in 800 ml of 20° warm water. The pH is 7–8. 45 ml of concentrated hydrochloric acid and then, within 15 minutes, a solution of 6.9 g of sodium nitrite in 20 ml of water are added dropwise while stirring. After 2 hours, a solution of 36.0 g of 1-(2',5'-disulphophenyl)-3-methyl-pyrazol-5-one in 200 ml of water is poured in and the pH of the reaction mixture is adjusted to 7 with sodium carbonate. On completion of the coupling, the yellow dyestuff is completely precipitated by the addition of sodium chloride, filtered off and dried in vacuo at 70°–80°.

The intermediate product, 1-phenyl[4'-N-(3"-amino-4"-sulphophenyl)-carbonamide]-3-methyl-pyrazol-5-one, necessary to produce this dyestuff is obtained by condensation of 4-nitrobenzoyl chloride with 2,4-diaminobenzene sulphonic acid, acetylation of the condensation product with acetic acid anhydride, reduction of the nitro group with iron powder, conversion of the amino compound by the usual method into the pyrazolone and saponification of the acetyl group in hydrochloric acid solution.

If the dyestuff is dyed onto cotton by the processes ususal for reactive dyestuffs from an alkaline bath in the presence of sodium chloride or sodium sulphate at 80°–100°, then a strong, brilliant, greenish yellow dyeing is obtained which has very good light fastness, excellent fastness to washing and perspiration and can be discharged well.

EXAMPLE 2

75.8 g of the monoazo dyestuff obtained by coupling diazotised 2-amino-4-(2',5',6'-trichloropyrimidyl-4'-amino)-benzene sulphonic acid with 1-phenyl[4'-N-(3"-amino-4"-sulphophenyl)-carbonamide]-3-methyl-pyrazol-5-one, in the form of the sodium salt, are slurried in 800 ml of 20° warm water. The pH is 7–8. 45 ml of concentrated hydrochloric acid and then, within 15 minutes, a solution of 6.9 g of sodium nitrite in 20 ml of water are added dropwise while stirring. After 2 hours, a solution of 31.0 g of 1-(4'-sulphophenyl)-3-carboxy-pyrazol-5-one in 200 ml of water is poured in and the pH of the reaction mixture is adjusted to 7 with sodium carbonate. On completion of the coupling, the yellow dyestuff is completely precipitated by the addition of sodium chloride, filtered off and dried in vacuo at 70°–80°.

If the dyestuff is dyed onto cotton by the processes usual for reactive dyestuffs from an alkaline bath in the presence of sodium chloride or sodium sulphate at 80°–100°, then a strong, brilliant, yellow dyeing is obtained which has very good light fastness, excellent fastness to washing and perspiration and can be discharged well.

Dyestuffs having similar properties are obtained if the amino monoazo dyestuffs listed in the following Table I in column II are diazotised as given in Example 2 and reacted with the coupling components given in column III. The shades of the corresponding dyeings on cotton are given in column IV.

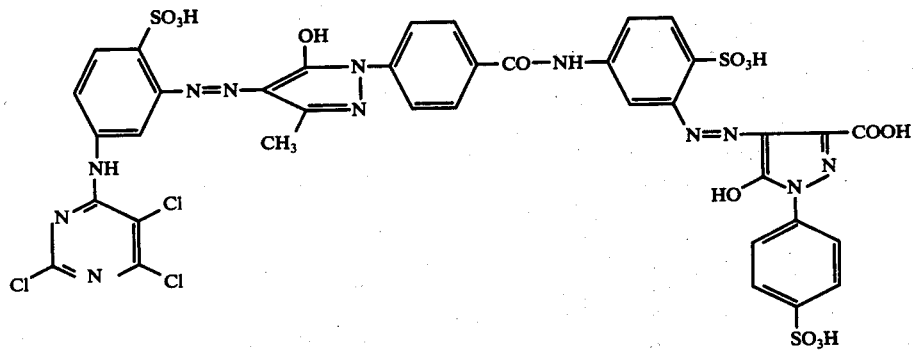

Table I

| Ex. No. | amino monoazo dyestuff | coupling component | shade on cotton |
|---|---|---|---|
| 3 | | | yellow |
| 4 | | " | yellow |
| 5 | | | yellow |
| 6 | | | yellow |

Table I-continued

| I Ex. No. | II amino monoazo dyestuff | III coupling component | IV shade on cotton |
|---|---|---|---|
| 7 | | | yellow |
| 8 | | | yellow |
| 9 | | " | yellow |
| 10 | | | yellow |
| 11 | | | yellow |

Table I-continued

| Ex. No. | amino monoazo dyestuff | coupling component | shade on cotton |
|---|---|---|---|
| 12 | | | orange |
| 13 | | | orange |
| 14 | | | red |
| 15 | | | yellow |

Table I-continued

| Ex. No. | amino monoazo dyestuff | coupling component | shade on cotton |
|---|---|---|---|
| 16 | (structure) | (structure) | yellow |
| 17 | (structure) | (structure) | yellow |
| 18 | (structure) | (structure) | yellow |

Table I-continued

| I | II | III | IV |
|---|---|---|---|
| Ex. No. | amino monoazo dyestuff | coupling component | shade on cotton |
| 19 | (structure) | (structure) | yellow |
| 20 | (structure) | (structure) | yellow |

Table I-continued

| Ex. No. | amino monoazo dyestuff | coupling component | shade on cotton |
|---|---|---|---|
| 21 | [structure] | [structure] | yellow |
| 22 | [structure] | [structure] | yellow |

Table I-continued

| Ex. No. | II amino monoazo dyestuff | III coupling component | IV shade on cotton |
|---|---|---|---|
| 23 | (structure: benzene with SO₃H, NH linked to dichloro-chloropyrimidine, N=N to pyrazolone with CH₃, HO, N-phenyl-CONH-phenyl with NH₂ and SO₃H) | " | yellow |
| 24 | (structure: benzene with SO₃H, NH linked to chloro-difluoropyrimidine, N=N to pyrazolone with COOH, HO, N-phenyl-CONH-phenyl with SO₃H and NH₂) | (structure: 1-(2-chloro-5-sulfophenyl)-3-methyl-5-hydroxypyrazole) | yellow |

Table I-continued
| I | II | III | IV |
|---|---|---|---|
| Ex. No. | amino monoazo dyestuff | coupling component | shade on cotton |
| 25 | 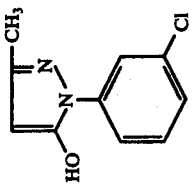 | 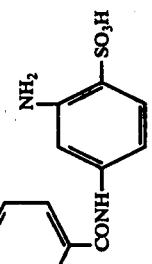 | yellow |

EXAMPLE 26

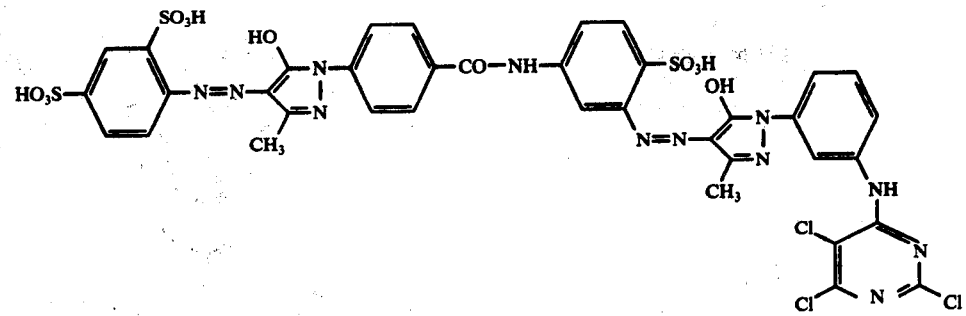

88.2 g of the amino disazo dyestuff of the formula

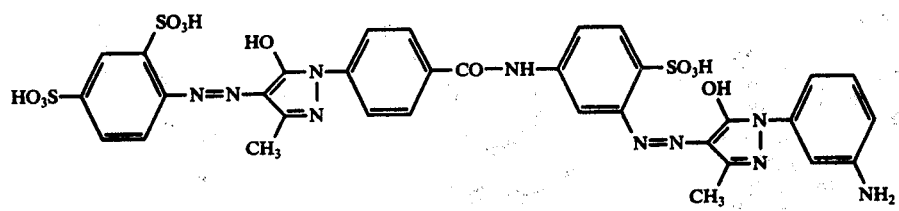

in the form of the sodium salt, are dissolved in 1000 ml of 60° warm water. 23 g of 2,4,5,6-tetrachloropyrimidine are added to this solution and the whole is condensed for 14 hours while stirring at 80°–85°, the pH being kept between 6 and 6.5 by the dropwise addition of 2N sodium carbonate solution. On completion of the condensation, the yellow dyestuff is completely precipitated by the addition of potassium chloride, filtered off and dried in vacuo at 60°–70°.

If viscose staple fibre is dyed with this dyestuff by the methods usual for reactive dyestuffs from an alkaline bath in the presence of sodium chloride at 80°–85°, then a level, strongly coloured greenish yellow dyeing having excellent fastness properties is obtained.

Dyestuffs have similar properties are obtained if the amino disazo dyestuffs listed in column II of the following Table II are condensed as given in Example 26 with the reactive components shown in column III. The shades of the corresponding dyeings on cotton are given in column IV.

Table II

| I<br>Ex. No. | II<br>amino disazo dyestuff | III<br>reactive component | IV<br>shade on cotton |
|---|---|---|---|
| 27 | ![structure] | ![structure] | yellow |
| 28 | " | ![structure] | yellow |
| 29 | " | ![structure] | yellow |

Table II-continued
| Ex. No. | amino disazo dyestuff | reactive component | shade on cotton |
|---|---|---|---|
| 30 | " | 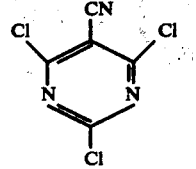 | yellow |
| 31 | " | 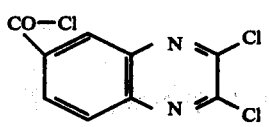 | yellow |
| 32 | 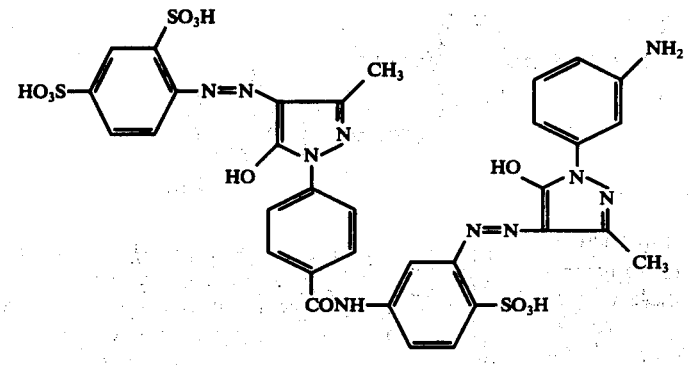 | 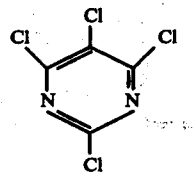 | yellow |
| 33 | " | 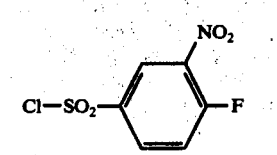 | yellow |
| 34 | 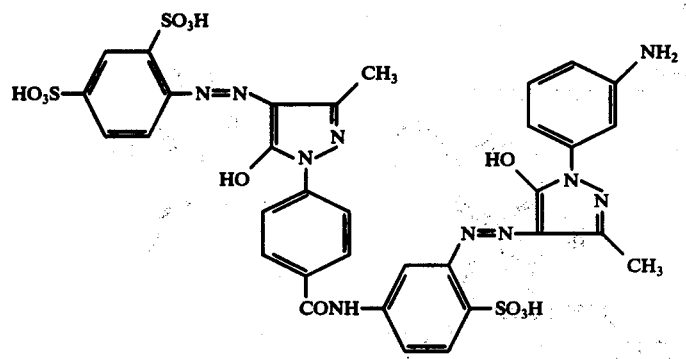 | 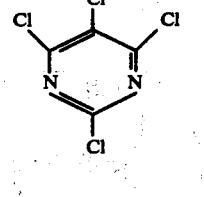 | yellow |
| 35 | " | 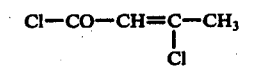 | yellow |
| 36 | " | 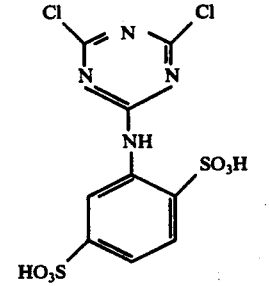 | yellow |

Table II-continued

| Ex. No. | amino disazo dyestuff | reactive component | shade on cotton |
|---|---|---|---|
| 37 | (structure: disazo dyestuff with SO₃H, HO₃S, CH₃, pyrazolone with HO, CONH linkage, SO₃H, CH₃, NH₂) | 2,4,5,6-tetrachloropyrimidine | yellow |
| 38 | " | 6-chlorocarbonyl-benzothiazole-2-sulfonic acid | yellow |
| 39 | " | 2-chloro-6-chlorosulfonyl-benzoxazole | yellow |
| 40 | " | Cl—OC—N(CH₃)—triazine with F and N(CH₃)₂ substituents | yellow |
| 41 | " | 2,6-dichloropyrimidine-4-carbonyl chloride | yellow |
| 42 | (structure: bis-pyrazolone disazo dyestuff with SO₃H, CH₃, HO, CONH, SO₃H, H₂N, CO₂H groups) | 2,4,5,6-tetrachloropyrimidine | yellow |
| 43 | " | 2,4-dichloropyrimidine-5-carbonyl chloride | yellow |
| 44 | " | 2-chloro-2,3,3-trifluoro-cyclobutane-1-carbonyl chloride | yellow |

Table II-continued

| I | II | III | IV |
|---|---|---|---|
| Ex. No. | amino disazo dyestuff | reactive component | shade on cotton |
| 45 | (structure) | (2,4,5,6-tetrachloropyrimidine) | yellow |
| 46 | (structure) | " | yellow |
| 47 | " | (4-fluoro-3-nitrobenzoyl chloride) | yellow |

EXAMPLE 48

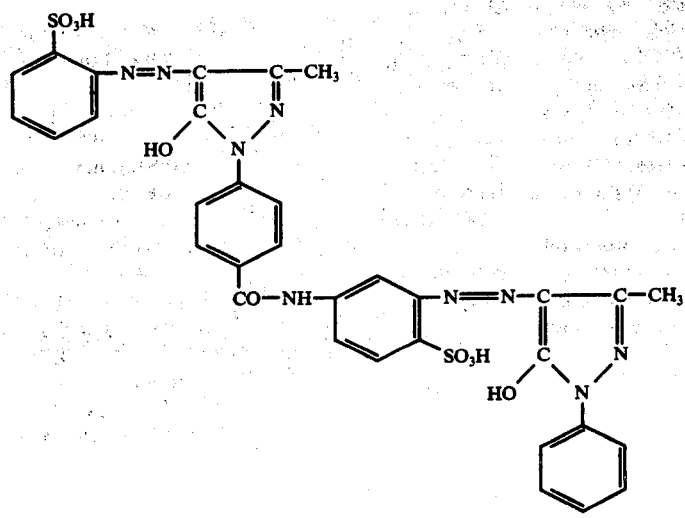

17.3 g of 2-aminobenzene sulphonic acid are dissolved with 10.5 ml of 10N sodium hydroxide solution in 100 ml of water. After the addition of 6.9 g of sodium nitrite (100%) in the form of a 33.3% solution, the solution is added dropwise to a mixture of 30 ml of concentrated hydrochloric acid and 100 g of ice, the addition being made while stirring at 0°-10°. The diazonium salt partly precipitates in the form of white crystals.

This suspension is then stirred for 30 minutes at 0°-10°, whereupon any nitrous acid present is decomposed by the addition of a small quantity of sulphamic acid.

The suspension of the diazonium salt is then added to a solution of 38.8 g of 1-phenyl-[4'-N-(3"-amino-4"-sulphophenyl)-carbonamide]-3-methyl-pyrazol-5-one in 600 ml of water which contains 21 ml of 10N sodium hydroxide solution and 20 g of sodium bicarbonate. The yellow solution obtained becomes opaque after a few minutes and the monoazo dyestuff precipitates as a jelly. After about 1 hour, no diazonium compound can be traced.

The pH of the dyestuff suspension is adjusted to 12.5 by the addition of the necessary amount of 10/N sodium hydroxide solution. The dyestuff dissolves. After adding 6.9 g of sodium nitrite (100%), in the form of a 33.3% solution, the clear solution of the amino mono- azo dyestuff is added dropwise within about 2 hours at 20°-22° to about 100 ml of 5N hydro chloric acid. The diazotisation is completed after stirring overnight. A little sulphamic acid is added and then the suspension of the diazonium azo compound obtained is added to a solution of 17.4 g of 1-phenyl-3-methyl-pyrazol-5-one and 4.5 g of sodium hydroxide in 500 ml of water and 500 ml or glycol monomethyl ether.

The reaction of the coupling mixture is made neutral to congo paper by the addition of sodium acetate whereupon it is stirred for 18 hours. The yellow-orange suspension of the disazo dyestuff is then heated to 60° and 10N sodium hydroxide solution is added until the reaction is phenolphthalein alkaline.

The disazo dyestuff formed is then precipitated at 60°-65° by the addition of sodium chloride. After filtering off and drying, it is a water-soluble yellow powder which dyes wool and synthetic polyamide fibres in yellow shades which are fast to water, washing and light.

EXAMPLE 49

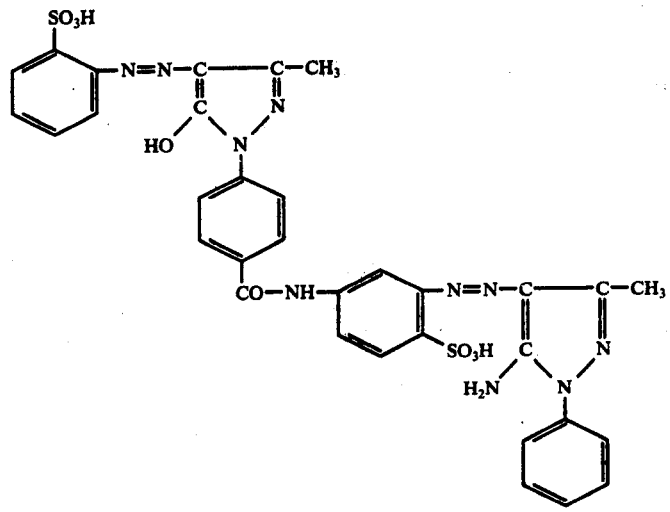

17.3 g of 2-aminobenzene sulphonic acid are diazotised as described in Example 48 and coupled with 38.8 g of 1-phenyl-[4'-N-(3"-amino-4"-sulphophenyl)-carbonamide]-3-methyl-pyrazol-5-one. The amino monoazo dyestuff obtained is then again diazotised as described in Example 48. After the addition of a little sulphamic acid, the suspension of the diazotised dyestuff is added at room temperature to the solution of 21.4 g of 1-phenyl-3-methyl-5-imino-pyrazole hydrochloride in 500 ml of water and 500 ml of glycol monomethyl ether.

The reaction of the coupling mixture is made neutral to congo paper by the addition of sodium acetate and the yellow suspension of the disazo dyestuff formed is stirred at room temperature until no more diazonium compound can be traced.

After heating to 60°, the reaction mixture is made phenolphthalein alkaline by the addition of 10N sodium hydroxide solution.

The disazo dyestuff obtained is salted out at 60° by the addition of sodium chloride and then filtered off. After drying, it is a water-soluble yellow powder which dyes synthetic polyamide fibres in very pure yellow shades. The dyeings have excellent fastness to water, washing, perspiration and light. The dyeings on texturised polyamide material are free from streaks.

Dyestuffs having similar properties are obtained if the amino azo dyestuffs listed in the following Table III in column II are diazotised analogously to Examples 48 and 49 and reacted with the coupling components given in column III. The shades of the corresponding dyeings on wool and synthetic polyamide fibres are given in column IV.

Table III

| I Ex. No. | II amino monoazo dyestuff | III coupling component | IV shade on wool and synthetic polyamide fibres |
|---|---|---|---|
| 50 | (structure) | (2-naphthol) | orange |
| 51 | " | (structure) | yellow |
| 52 | " | (structure) | yellow |
| 53 | " | (structure) | yellow |

Table III-continued

| Ex. No. | amino monoazo dyestuff | coupling component | shade on wool and synthetic polyamide fibres |
|---|---|---|---|
| 54 | [structure: phenyl-N=N-pyrazolone with CH₃, HO, N-phenyl-CONH-(aminobenzene-SO₃H)] | [structure: naphthalene with HO₃S and CH, amino group] | orange |
| 55 | " | [structure: naphthalene with OH and SO₃H] | orange |
| 56 | " | [structure: naphthalene with NH₂ and SO₃H] | orange |
| 57 | [structure: phenyl-N=N-pyrazolone with CH₃, HO, N-phenyl-CONH-(aminobenzene-SO₃H)] | [structure: naphthalene with NH₂ and HO₃S] | orange |
| 58 | " $\xrightarrow{acid}$ | [structure: naphthalene with OH, NH₂, HO₃S] | scarlet |
| 59 | " | [structure: pyrazolone with CH₃, phenyl-SO₃H (meta)] | yellow |
| 60 | " | [structure: pyrazolone with CH₃, phenyl-NH-CO-CH₂-Cl (para)] | yellow |

Table III-continued

| Ex. No. | amino monoazo dyestuff | coupling component | shade on wool and synthetic polyamide fibres |
|---|---|---|---|
| 61 | (phenyl-N=N-pyrazolone with CH₃, HO, N-phenyl-CONH-(3-amino-4-sulfophenyl)) | (pyrazole with CH₂, CH₃, HN, N-(3-sulfophenyl)) | yellow |
| 62 | " | (pyrazolone with CH₂, CH₃, O, N-(3-chlorophenyl)) | yellow |
| 63 | (3-sulfamoylphenyl-N=N-pyrazolone with CH₃, HO, N-phenyl-CONH-(3-amino-4-sulfophenyl)) | (pyrazole with CH₂, CH₃, HN, N-phenyl) | yellow |
| 64 | " | (2,4-dimethylphenol, OH) | yellow |
| 65 | (2-sulfophenyl-N=N-pyrazolone with CH₃, HO, N-phenyl-CONH-(3-amino-4-sulfophenyl)) | (pyrazolone with CH₂, CH₃, O, N-phenyl) | yellow |
| 66 | " | (pyrazole with CH₂, CH₃, HN, N-phenyl) | yellow |

Table III-continued

| I | II | III | IV |
|---|---|---|---|
| Ex. No. | amino monoazo dyestuff | coupling component | shade on wool and synthetic polyamide fibres |
| 67 | 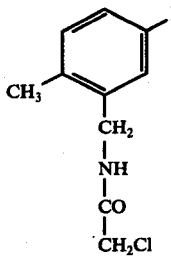 | 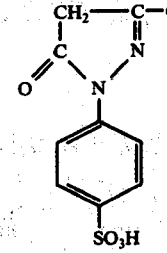 | yellow |

EXAMPLE 68

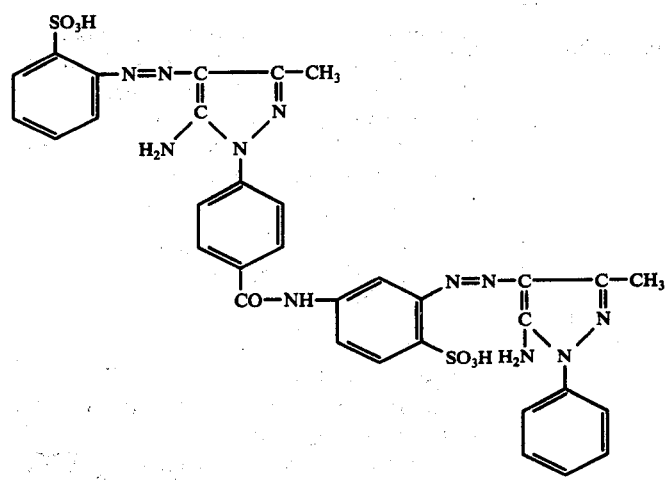

17.3 g of 2-aminobenzene sulphonic acid are diazotised according to example 48 and coupled in the known way with 39.5 g of 1-phenyl-[4'-N-(3''-amino-4''-sulphophenyl)-carbonamide]-3-methyl-5-iminopyrazole.

The amino monoazo dyestuff obtained is then again diazotised as described in example 48. After the addition of a little sulphamic acid, the suspension of the diazotised dyestuff is added at room temperature to the solution of 21.4 g of 1-phenyl-3-methyl-5-iminopyrazole hydrochloride in 500 ml of water and 500 ml of glycol monomethyl ether.

The coupling mixture is made neutral to congo paper by the addition of sodium acetate. The yellow suspension of the disazo dyestuff formed is stirred at room temperature until no more diazonium compound can be traced.

After heating to 60°, the reaction mixture is made phenolphthalein alkaline by the addition of 10 N sodium hydroxide solution.

The disazo dyestuff obtained is salted out at 60°, and filtered off. After drying, it is a water-soluble yellow powder which dyes synthetic polyamide fibres in very pure yellow shades. The dyeings have excellent fastness to water, washing, perspiration and light. Dyeings on texturised polyamide material are free from streaks.

EXAMPLE 69

2 g of dyestuff prepared according to example 67 and 3 g of ammonium sulphate are dissolved in 5000 ml of warm water. 100 g of well wetted wool fabric are introduced, the bath is brought to the boil within 30 minutes and dyeing is performed for 1 hour at the boil. The wool is then thoroughly rinsed with water. In this way a deep yellow dyeing is obtained which has very good wet fastness properties.

EXAMPLE 70

A printing paste was prepared by mixing 30 g of the dyestuff according to Example 2, with 100 g of urea and, while stirring, dissolving it in 360 ml of hot water. To the resulting solution, 10 g of the sodium salt of m-nitrobenzene sulphonic acid are added and then the mixture is added with stirring to 475 g of 5% sodium alginate thickening. By stirring, a homogeneous paste is obtained which is allowed to cool. 25 g of sodium bicarbonate are added thereto.

Cotton fabric is printed with this printing paste. After drying, the printed fabric is subjected for 2 minutes to a dry heat of 140°-160°. After rinsing and soaping, a yellow wet-fast print is obtained.

What is claimed is:
1. A dyestuff of the formula

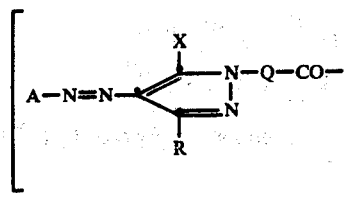

-continued

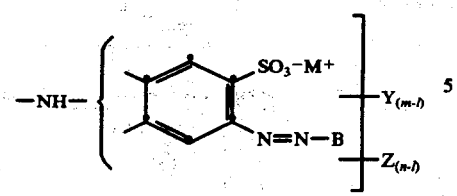

wherein
A represents phenyl, naphthyl or phenyl or naphthyl substituted by lower alkyl or sulphamoyl,
B represents phenyl, lower alkyl-phenyl, naphthyl, phenol, lower alkylphenol, naphthol, benzoylaminonaphthol, N-methyl-N'-m-chloro-phenyl barbituric acid, or di-(phenylamino) malonic acid,
Q represents 1,3- or 1,4-phenylene or 1,3- or 1,4-phenylene substituted by lower alkyl, chloro or bromo,
R represents lower alkyl or COO$^-$M$^+$,
X represents hydroxy or NH$_2$,
Y represents a group directly linked to a ring carbon atom of A or B and has the formula

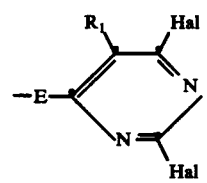 (I)

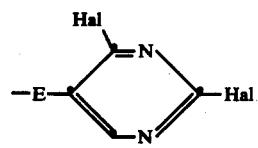 (II)

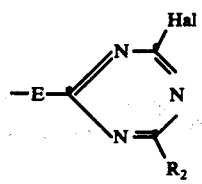 (III)

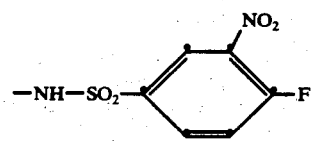 (IV)

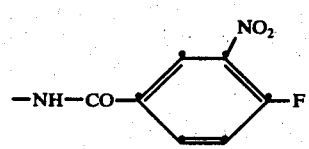 (V)

—SO$_2$—CH$_2$—CH$_2$—OSO$_3$$^-$M$^+$ (VI)

 (VII)

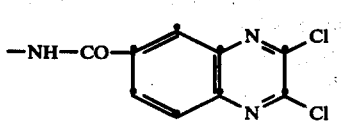 (VIII)

in which G is CO or SO$_2$, W is O or S, and Z is Cl, Br, SO$_3$$^-$H$^+$,

-continued

—NHCO—CH$_2$Cl (IX)

 (X)

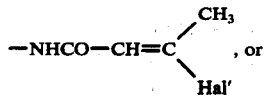 (XI)

wherein E represents —NH—,

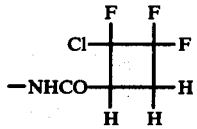

* the bond being linked to the remainder of Y,
Hal represents fluorine, chlorine or bromine,
Hal' represents chlorine or bromine,
R$_1$ represents hydrogen, chlorine, bromine or cyano,
R$_2$ represents fluorine, chlorine, bromine, lower alkylamino, di-(lower)-alkylamino or

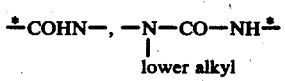

P representing 1 or 2,
Z represents SO$_3$$^-$M$^+$ or COO$^-$M$^+$ linked to a ring carbon of A, Q or B
M$^+$ represents hydrogen, sodium or potassium,
m represents a positive integer of at most 3, and
n represents a positive integer of at most 5,
and wherein which when m is 3, one Y is linked to A and the other to B.

2. A dyestuff as defined in claim 1 wherein m represents 1 and n represents 1 or 2.

3. A dyestuff as defined in claim 1 wherein m represents 2 or 3 and n represents an integer ranging from 2 to 5.

4. A dyestuff as defined in claim 1 wherein Y represents a fibre-reactive grouping selected from

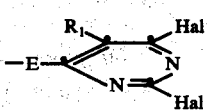 (I)

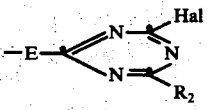 (II)

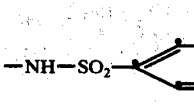 (III)

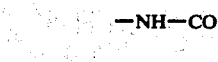

—SO$_2$—CH$_2$—CH$_2$—OSO$_3$$^-$M$^+$ (IV)

-continued $$-NH-CO-\underset{\text{(benzene ring fused with N=C-Cl, N-Cl)}}{\bigcirc} \quad \text{(V)}$$

$$-NH-CO-\underset{\text{(benzothiazole with C-SO}_3^-M^+\text{)}}{\bigcirc} \quad \text{(VI)}$$

—NHCO—CH$_2$Cl (VII)

$$-NHCO-CH=C\underset{Hal'}{\overset{CH_3}{\diagdown}}, \text{ and} \quad \text{(VIII)}$$

$$-NHCO-\underset{\substack{| \quad | \\ H \quad H}}{\overset{\substack{F \quad F \\ | \quad |}}{\underset{\text{Cl}}{\square}}}\text{-H} \quad \text{(IX)}$$

Hal representing fluorine, chlorine or bromine,
Hal' representing chlorine or bromine,
R$_1$ representing hydrogen, chlorine, bromine or cyano,
R$_2$ representing fluorine, chlorine, bromine, lower alkylamino, or $$-NH-\underset{}{\bigcirc}(SO_3^-M^+)_p$$

p representing 1 or 2, and
  representing —NH—, $$-\underset{\substack{| \\ \text{Lower alkyl}}}{N}-CO-NH^*-,$$

or —NH—CO—,
the bond — being linked to the remainder of Y.

5. A dyestuff as defined in claim 3 wherein Y represents a fibre-reactive grouping selected from $$-E-\underset{N}{\overset{R_1}{\underset{\diagdown}{\bigvee}}}\overset{Hal}{\underset{Hal}{\diagup N}} \quad \text{(I)}$$

$$-E-\underset{N}{\overset{N}{\underset{\diagdown}{\bigvee}}}\overset{Hal}{\underset{R_2}{\diagup N}} \quad \text{(II)}$$

$$-NH-SO_2-\underset{\text{(benzene with NO}_2\text{)}}{\bigcirc}-F, $$

$$-NH-CO-\underset{\text{(benzene with NO}_2\text{)}}{\bigcirc}-F \quad \text{(III)}$$

—SO$_2$—CH$_2$—CH$_2$—OSO$_3^-$M$^+$ (IV)

$$-NH-CO-\underset{\text{(benzene fused with N=C-Cl, N-Cl)}}{\bigcirc} \quad \text{(V)}$$

-continued $$-NH-CO-\underset{\text{(benzothiazole)}}{\bigcirc}\text{C}-SO_3^-M^+ \quad \text{(VI)}$$

—NHCO—CH$_2$Cl (VII)

$$-NHCO-CH=C\underset{Hal'}{\overset{CH_3}{\diagdown}}, \text{ and} \quad \text{(VIII)}$$

$$-NHCO-\underset{\substack{| \quad | \\ H \quad H}}{\overset{\substack{F \quad F \\ | \quad |}}{\underset{\text{Cl}}{\square}}}\text{-H} \quad \text{(IX)}$$

Hal representing fluorine, chlorine or bromine,
Hal' representing chlorine or bromine,
R$_1$ representing hydrogen, chlorine, bromine or cyano,
R$_2$ representing fluorine, chlorine, bromine, lower alkylamino, or $$-NH-\underset{}{\bigcirc}(SO_3^-M^+)_p$$

p representing 1 or 2, and
E representing —NH—, $$-\underset{\substack{| \\ \text{lower alkyl}}}{N}-CO-NH^\pm,$$

$$-\underset{\substack{| \\ \text{Lower alkyl}}}{N}-CO-NH^*-,$$

or —NH—CO—,
the bond — being linked to the remainder of Y.

6. A dyestuff of the formula $$\left[ A-N=N-\underset{\substack{| \\ R}}{\overset{X}{\underset{N}{\bigcup}}}\overset{}{\underset{}{\diagup}}N-Q-CO- \right]$$

$$-NH-\left\{\underset{\substack{| \\ N=N-B}}{\bigcirc}SO_3^-M^+\right\}\begin{matrix}Y_{(m-l)}\\Z_{(n-l)}\end{matrix}$$

wherein
A represents phenyl, naphthyl or phenyl or naphthyl substituted by lower alkyl or sulphamoyl,
B represents phenyl, lower alkyl-phenyl, naphthyl, phenol, lower alkylphenol, naphthol, or benzoylaminonaphthol, Q represents 1,3- or 1,4-phenylene or 1,3- or 1,4-phenylene substituted by lower alkyl, chloro or bromo,
R represents lower alkyl or COO⁻M⁺
X represents hydroxy or NH₂
Y represents a group directly linked to a ring carbon atom of A or B and has the formula

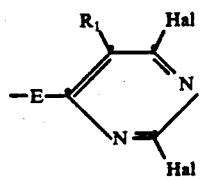 (I)

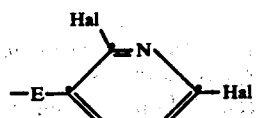 (II)

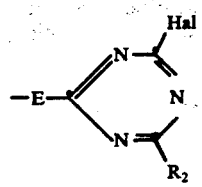 (III)

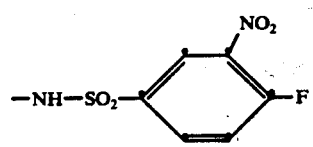 (IV)

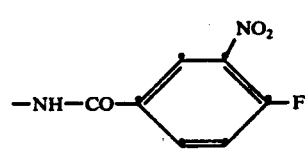 (V)

 (VI)

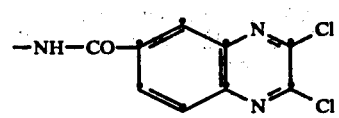 (VII)

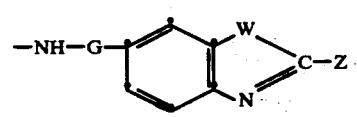 (VIII)

in which G is CO or SO₂, W is O or S, and Z is Cl, Br, SO₃⁻H⁺,

 (IX)

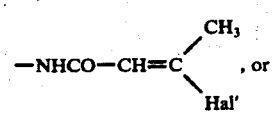 (X)

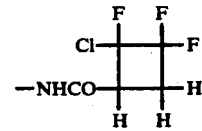 (XI)

wherein E represents —NH—,

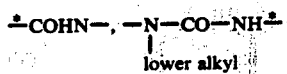

* the bond being linked to the remainder of Y,
Hal represents fluorine, chlorine or bromine,
Hal' represents chlorine or bromine,
R₁ represents hydrogen, chlorine, bromine or cyano,
R₂ represents fluorine, chlorine, bromine, lower alkylamino, di-(lower)-alkylamino or

P representing 1 or 2,
Z represents SO₃⁻M⁺ or COO⁻M⁺ linked to a ring carbon of A, Q or B
M⁺ represents hydrogen, sodium or potassium,
m represents a positive integer of at most 3, and
n represents a positive integer of at most 5,
and wherein which when m is 3, one Y is linked to A and the other to B.

7. A dyestuff of the formula

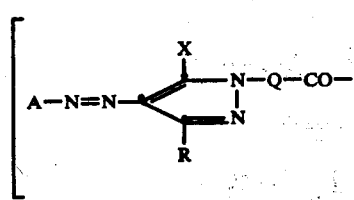

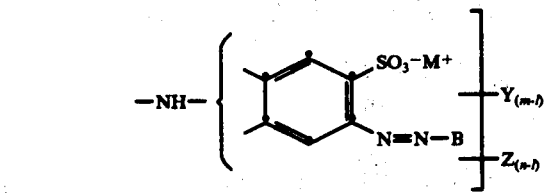

wherein
A represents phenyl, naphthyl or phenyl or naphthyl substituted by lower alkyl or sulphamoyl,
B represents N-methyl-N'-m-chloro-phenyl barbituric acid
Q represents 1,3- or 1,4-phenylene or 1,3- or 1,4-phenylene substituted by lower alkyl, chloro or bromo,
R represents lower alkyl or COO⁻M⁺
X represents hydroxy or NH₂,
Y represents a group directly linked to a ring carbon atom of A or B and has the formula

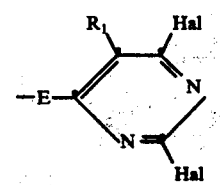 (I)

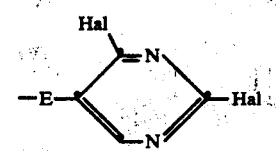 (II)

-continued

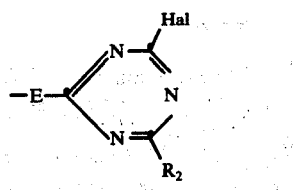 (III)

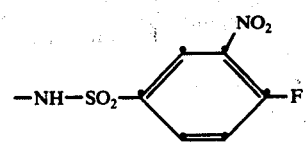 (IV)

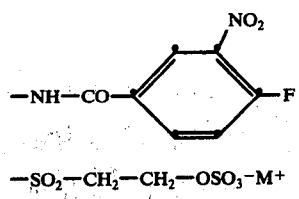 (V)

—SO$_2$—CH$_2$—CH$_2$—OSO$_3^-$M$^+$ (VI)

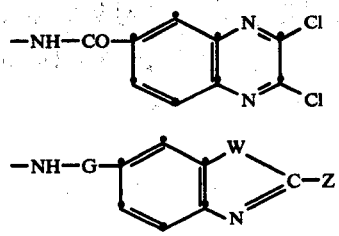 (VII)

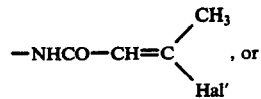 (VIII)

in which G is CO or SO$_2$, W is O or S, and Z is Cl, Br, SO$_3^-$H$^+$,

—NHCO—CH$_2$Cl (IX)

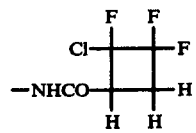 (X)

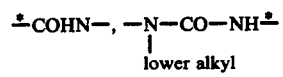 (XI)

wherein E represents —NH—,

COHN—, —N—CO—NH
　　　　　　　　|
　　　　　　lower alkyl

\* the bond being linked to the remainder of Y,
Hal represents fluorine, chlorine or bromine,
Hal' represents chlorine or bromine,
R$_1$ represents hydrogen, chlorine, bromine or cyano,
R$_2$ represents fluorine, chlorine, bromine, lower alkylamino, di-(lower)-alkylamino or

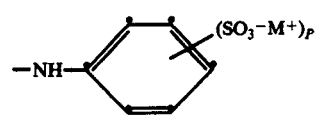

P representing 1 or 2,
Z represents SO$_3^-$M$^+$ or COO$^-$M$^+$ linked to a ring carbon of A, Q or B
M$^+$ represents hydrogen, sodium or potassium, m represents a positive integer of at most 3, and
n represents a positive integer of at most 5,
and wherein which when m is 3, one Y is linked to A and the other to B.

8. A dyestuff of the formula

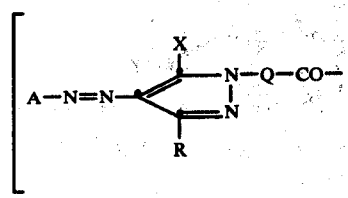

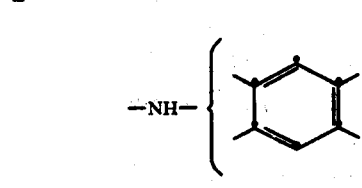

wherein
A represents phenyl, naphthyl or phenyl or naphthyl substituted by lower alkyl or sulphamoyl,
B represents di-(phenylamino) malonic acid,
Q represents 1,3- or 1,4-phenylene or 1,3- or 1,4-phenylene substituted by lower alkyl, chloro or bromo,
R represents lower alkyl or COO$^-$M$^+$
X represents hydroxy or NH$_2$
Y represents a group directly linked to a ring carbon atom of A or B and has the formula

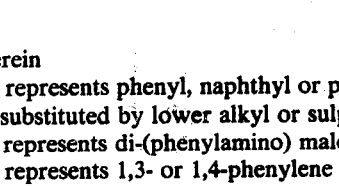 (I)

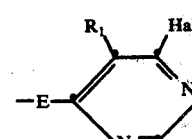 (II)

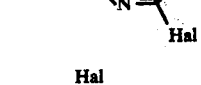 (III)

 (IV)

 (V)

—SO$_2$—CH$_2$—CH$_2$—OSO$_3^-$M$^+$ (VI)

-continued

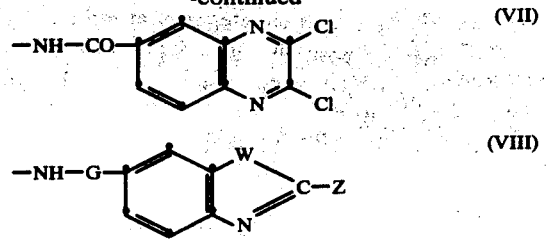

in which G is CO or SO$_2$, W is O or S, and Z is Cl, Br, SO$_3^-$H$^+$,

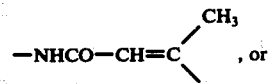 (IX)

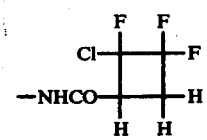 (X)

(XI)

wherein E represents —NH—,

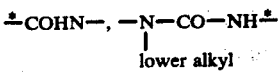 (VII)

(VIII)

* the bond being linked to the remainder of Y,
Hal represents fluorine, chlorine, or bromine,
Hal' represents chlorine or bromine,
R$_1$ represents hydrogen, chlorine, bromine or cyano,
R$_2$ represents fluorine, chlorine, bromine, lower alkylamino, di-(lower)-alkylamino or

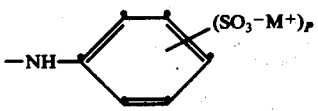

P representing 1 or 2,
Z represents SO$_3^-$M$^+$ or COO$^-$M$^+$ linked to a ring carbon of A, Q or B
M$^+$ represents hydrogen, sodium or potassium,
m represents a positive integer of at most 3, and
n represents a positive integer of at most 5,
and wherein which when m is 3, one Y is linked to A and the other to B.

* * * * *